June 2, 1959 — A. J. OSWALT — 2,889,046
MERCURY SEPARATOR
Filed Nov. 6, 1956
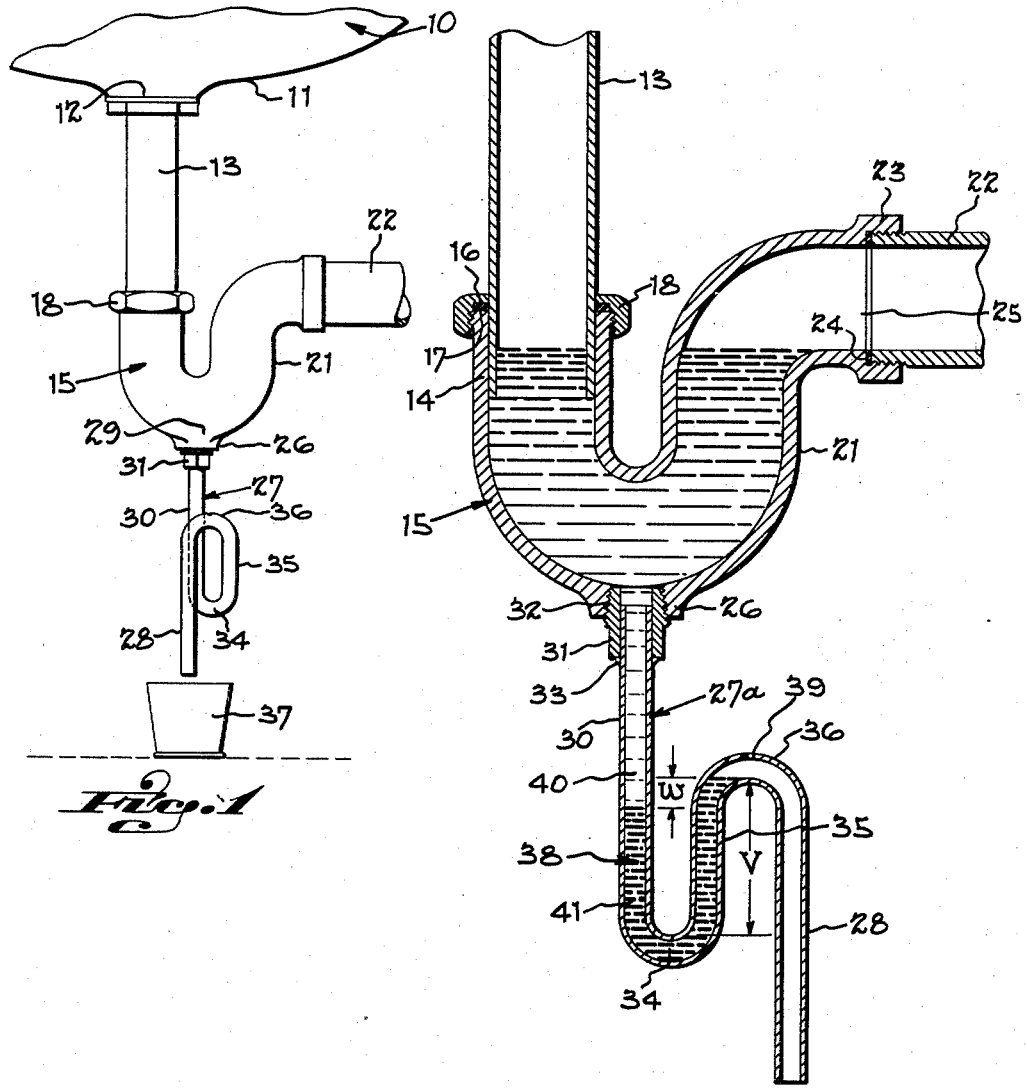
INVENTOR.
Andrew J. Oswalt.
BY Wood, Herron & Evans.
ATTORNEYS.

United States Patent Office 2,889,046
Patented June 2, 1959

2,889,046

MERCURY SEPARATOR

Andrew J. Oswalt, Cincinnati, Ohio

Application November 6, 1956, Serial No. 620,626

4 Claims. (Cl. 210—153)

The present invention relates to plumbing fixtures and is particularly directed to a novel device for recovering mercury which has been inadvertently dropped into the drain of a sink or other fixture.

Presently, there are many laboratories, hospitals, and other institutions using substantial quantities of mercury. During the normal operation of such a laboratory or the like, it frequently occurs that mercury is dropped into the drain of a sink or other fixture. In the past, this mercury has collected in the bottom of the conventional sanitary drain trap which forms a seal between the sink and the sewage disposal lines. This is disadvantageous for two reasons. In the first place, over a period of time, a substantial amount of mercury is lost in this manner. Furthermore, the mercury form an amalgam with the metal forming the trap whereby that metal softens requiring the trap to be replaced. In fact, some traps less than a year old, have required replacing because of the damage caused by mercury accumulations.

The principal object of the present invention is to provide a mercury separator adapted to be connected to a sanitary trap. The present mercury separator functions to receive mercury from the sanitary trap, separate it from the waste liquid, and deliver it to a suitable container from which the mercury may be recovered for future use.

One preferred form of the present separator comprises a first vertical conduit, adapted to be connected to the lowermost portion of a sanitary trap. This first vertical conduit is joined by a U shaped bend to a second vertical conduit which extends upwardly and is in turn joined by an inverted bend to a downwardly opening discharge conduit which empties into a mercury receiving container. This separator is formed of a plastic or metal which is not affected by mercury. Since most laboratories which handle mercury also utilize substantial amounts of acid, the material forming the separator is also preferably acid resistant. Before the separator is placed in service, a sufficient quantity of mercury is placed in the separator to fill the first U shaped bend and thereby provide a fluid seal in the separator.

In operation, waste liquid entering the sanitary trap flows through that trap and is discharged to the sewer system in a conventional manner. However, if the waste liquid should contain mercury, the mercury being heavier than the liquid, immediately drops into the first vertical conduit of the mercury separator and coalesces with the mercury originally placed in the separator. Eventually, a sufficient quantity of mercury is collected in the separator so that the mercury level in the second vertical conduit rises to the level of the inverted bend; and thereafter, each additional drop of mercury entering the separator forces a similar quantity of mercury through the inverted bend from which it drops into the discharge tube and the container below.

One of the principal advantages of the present mercury separator is that it provides a ready means for both recovering otherwise wasted mercury, and at the same time, protecting sanitary drain traps from damage due to mercury deposits.

A further advantage of the present separator is that it is of extremely simple construction and can be economically manufactured and installed. Moreover, because of its extreme simplicity, the present separator is completely reliable in operation and requires no maintenance.

A still further advantage of the present separator is that it does not interfere in any way with the normal installation or operation of a sanitary trap. Furthermore, the recovered mercury can be removed without disconnecting any fittings or emptying the sanitary trap.

These and other objects and advantages of the present invention will be more readily apparent from a further consideration of the following detailed description of the drawings illustrating a preferred embodiment of the invention.

In the drawings:

Figure 1 is a front elevational view of a sink trap fitted with a mercury separator constructed in accordance with the present invention; and Figure 2 is a vertical cross-sectional view through a trap provided with a slightly modified form of mercury separator.

Figure 1 shows a preferred embodiment of the present invention incorporated in a discharge line from a laboratory sink or the like. It is to be understood that while the present mercury separator is particularly advantageous for use with laboratory sinks, it is also useful when installed with traps leading from other types of fixtures in which mercury is likely to be dropped.

As shown in Figures 1 and 2, the bottom wall 11 of sink 10 is provided with a drain opening 12, to which is secured in any suitable manner, a vertical discharge pipe 13. The lower end of this pipe is received within an upwardly extending leg 14 of a generally U-shaped sanitary trap 15. A fluid tight joint is formed between the inlet arm 15 of this trap and pipe 13, in any suitable manner; such as, by means of a gasket 16 compressed between the end 17 of trap arm 14 and a nut 18 surrounding pipe 13 in threaded engagement with the end of arm 14. Vertical discharge arm 21 of the main trap is joined to a pipe 22 of the sewer system; this pipe being threadably received in a flange 23 of the discharge arm so as to compress gasket 24 and form a fluid tight seal. The upper end of inlet arm 14 and discharge opening 25 of the trap are substantially at the same level.

Sanitary trap 15 is preferably provided with a boss 26 formed at the bottom of the U section 29 to facilitate connecting the trap and mercury separator 27. It is to be understood that the only difference between mercury separator 27a of Figure 2 and separator 27 of Figure 1 is that the downwardly extending discharge leg 28 of the separator in Figure 2 is spaced from connecting leg 30 of the separator. While in the embodiment of Figure 1, the inverted U of the separator is bent so that leg 28 is disposed adjacent to connecting leg 30 to form a more compact unit. In all other respects, the two embodiments are identical and function in exactly the same manner. Consequently, the same reference numerals have been applied to both figures.

As best shown in Figure 2, mercury separator 27a includes a vertically extending connecting leg 30. This leg is joined to the bottom of trap 15 in any suitable manner, such as by means of a coupling member 31 which threadably engages an opening 32 formed in sanitary trap 15. Leg 30 of the mercury separator fits within the coupling member and is soldered thereto as at 33.

In addition to connecting leg 30, the mercury separator includes a first U bend joining connecting leg 30 and vertical leg 35 and a second inverted U bend 36 joining vertical leg 35 and discharge leg 28. The lower end of discharge leg 28 is open and empties into a suitable container 37 adapated to receive reclaimed mercury. Inverted bend 36 is preferably provided with a small opening 39 in the upper wall thereof to prevent syphoning. The mercury separator and container 37 are preferably formed of a material, such as a plastic or metal alloy which is not adversely affected by contact with mercury.

Before being placed in service, mercury separator 27 is partially filled with a quantity of mercury 38 sufficient to fill U section 34 and extend at least partially up in legs 30 and 35. It is to be noted that the length of vertical leg 35 is at least equal $1/13.5 \times$ the distance from U shaped bend 34 to the highest level of water in the sink or fixture. Thus, even when the sink is completely filled with water, the resulting head will be balanced by column "V" of mercury; so that this column will remain in the mercury separator to seal bend 34 when the sink is emptied.

The condition when the sink is empty is shown in Figure 2; as there show, the water level in sanitary trap 15 extends to the lower most height of discharge opening 25 and sewer pipe 22. A column of water 40 also extends downwardly into vertical tube 30 of the mercury separator, the combined head of this column and the water in the trap being balanced by the column of mercury "W" in vertical tube 35.

In operation, when water is discharged into the sink, it flows through the sanitary trap and enters sewer line 22 in the usual manner. However, any drops of mercury flowing through the sink drain opening 12, fall into the trap and enter the mercury separator. Being heavier than water, these mercury drops fall through vertical leg 30 and become part of the mercury column 41 in that leg. As soon as a sufficient quantity of mercury has accumulated, each additional drop of mercury coming into contact with column 41 forces a similar drop of mercury to be discharged from inverted U bend 36 and tube 28 into storage container 37.

It will be appreciated that container 37 can be emptied as often as desired without disturbing the mercury separator or sanitary drain 15. Moreover, once it has been installed, the present mercury separator requires no maintenance and in no way interferes with the operation of the main sanitary trap.

From the foregoing disclosure of the general principles of the present invention and the detailed disclosure of two preferred embodiments, those skilled in the art will readily comprehend the various modifications to which the present invention is susceptible. Thus, for example, it is contemplated that if a compact unit is desired, bend 36 can be reversed so that tube 28 extends downwardly adjacent to leg 30 as shown in Figure 1. Moreover, the mercury separator could be formed integral with sanitary trap 15 if desired; or could be joined thereto by other types of fittings than connector 31. Also, it is not necessary that section 30, 35 and 28 be cylindrical tubes of the same diameter; although when the separator is formed from a single length of pipe bent as shown, it is extremely economical to produce.

Having described my invention, I claim:

1. A mercury separator adapted for use in connection with a sanitary drain, said mercury separator comprising a first vertical leg disposed beneath said drain, means interconnecting said first vertical leg and said sanitary drain, a U shaped bend interconnecting said first vertical leg and a second vertical leg the length of said second vertical leg being at least equal to $1/13.5 \times$ the distance from said U-shaped bend to the maximum fluid level above said trap, a second inverted bend interconnecting said second vertical leg and a discharge conduit said second inverted bend and said discharge conduit being disposed below the sanitary drain, and a quantity of mercury contained in the first named bend and providing a fluid seal at said bend.

2. A mercury separator adapted for use in connection with a sanitary drain, said mercury separator comprising a first vertical leg disposed beneath said drain, means interconnecting said first vertical leg and said sanitary drain, a U shaped bend interconnecting said first vertical leg and a second vertical leg, the length of said second vertical leg being at least equal to $1/13.5 \times$ the distance from said U shaped bend to the maximum fluid level above said trap, a second inverted bend interconnecting said second vertical leg and a discharge conduit said second inverted bend and said discharge conduit being disposed below said sanitary drain, and a quantity of mercury contained in the U shaped bend and providing a fluid seal at said bend.

3. A mercury separator adapted for use in connection with a sanitary drain, said mercury separator comprising a length of tubing configurated to form first vertical leg adapted for connection to the lowermost portion of said sanitary drain, a U shaped bend interconnecting said first vertical leg and a second vertical leg the length of said second vertical leg being at least equal to $1/13.5 \times$ the distance from said U-shaped bend to the maximum fluid level above said trap, and a second inverted bend interconnecting said second vertical leg and a third vertical leg, said second inverted bend and said third vertical leg being disposed below said sanitary drain, and a quantity of mercury contained in first bend and providing a fluid seal at said bend, the quantity of mercury and the diameter of said tube being related so that said mercury is adapted to form a column in said second tube of sufficient height to balance the maximum head to which said separator is subjected.

4. A mercury separator adapted for connection to a sanitary trap, said mercury separator comprising a vertically extending leg having an upper end in fluid communication with the sanitary trap and a lower end, a vertical conduit in fluid communication with the lower end of said leg, the length of said vertical conduit being at least equal to $1/13.5 \times$ the distance from the lower end of said leg to the maximum fluid level of said trap, and a discharge conduit joined to the vertical conduit at a point spaced vertically upwardly from the lower end of the leg and at a point spaced vertically downwardly from the sanitary trap, said discharge conduit lying wholly below the sanitary trap, and a quantity of mercury normally extending an appreciable distance upwardly within said leg and said vertical conduit.

References Cited in the file of this patent

UNITED STATES PATENTS

| | | |
|---|---|---|
| 309,395 | McClellan | Dec. 16, 1884 |
| 644,142 | Mulherin | Feb. 27, 1900 |
| 713,292 | Edwards | Nov. 11, 1902 |